(12) United States Patent
Ginzburg et al.

(10) Patent No.: US 7,397,814 B2
(45) Date of Patent: Jul. 8, 2008

(54) METHOD AND APPARATUS TO ESTIMATE COLLISION RATE PARAMETER

(75) Inventors: Boris Ginzburg, Haifa (IL); Vladimir Kondratiev, Haifa (IL); Alexander Tolpin, Netanya (IL)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 10/729,940

(22) Filed: Dec. 9, 2003

(65) Prior Publication Data

US 2005/0122989 A1    Jun. 9, 2005

(51) Int. Cl.
*H04L 12/413* (2006.01)

(52) U.S. Cl. .................. 370/445; 370/465; 370/448; 370/338; 370/345; 370/349; 370/447

(58) Field of Classification Search ........... None
See application file for complete search history.

(56) References Cited

U.S. PATENT DOCUMENTS

| | | | | |
|---|---|---|---|---|
| 4,352,105 A | * | 9/1982 | Harney | 250/338.1 |
| 6,285,662 B1 | | 9/2001 | Watanabe et al. | |
| 2002/0154653 A1 | * | 10/2002 | Benveniste | 370/447 |
| 2004/0028072 A1 | * | 2/2004 | Moutarlier | 370/448 |

FOREIGN PATENT DOCUMENTS

EP    1 255 376    11/2002

OTHER PUBLICATIONS

Bruno, R. et al., "A simple protocol for the dynamic tuning of the backoff mechanism in IEEE 802.11 networks", Computer Networks, Elsevier Science Publishers B.V., Amsterdam, NL, vol. 37, No. 1, Sep. 2001, pp. 33-44.

Haitao, Wu et al., "IEEE 802.11 distributed coordination function (DCF): analysis and enhancement", ICC 2002, 2002 IEEE International Conference on Communications, Conference Proceedings, New York, NY, Apr. 28-May 2, 2002, IEEE International Conference on Communications, US, vol. 1 of 5, pp. 605-609.

IEEE Standard Part 11: wireless LAN medium access control (MAC) and physical layer (PHY) specification (ISO/IEC 8802-11, ANS/IEEE std 802.11-1999), Chapter 9: MAC sublayer functional ISO/IEC 8802-11 ANS/IEEE STD 802.11, XX, XX, Aug. 20, 1999, pp. 70-97.

International Search Report from PCT/US2004/039303, mailed Mar. 23, 2005.

* cited by examiner

*Primary Examiner*—Raj K Jain
(74) *Attorney, Agent, or Firm*—Pearl Cohen Zedek Latzer, LLP

(57) ABSTRACT

Briefly, a method and apparatus to estimate a collision rate parameter by manipulating a first probability value with a second probability value. The first probability value may be the probability of an attempt to transmit a data packet within a desired time slot of a contention window. The second probability value may be a probability of data packet transmitted from the desired time slot within the contention window to collide with an at least one other data packet transmitted by other station of wireless communication network.

6 Claims, 4 Drawing Sheets

METHOD AND APPARATUS TO ESTIMATE COLLISION RATE PARAMETER

BACKGROUND OF THE INVENTION

In wired and/or wireless local area networks (e.g. LAN and WLAN, respectively) devices may use an access mechanism to access the network. An example of an access mechanism may be a Carrier Sense Multiple Access with Collision Avoidance (CSMA/CA) and, more specifically, CSMA/CA with a binary exponential backoff method.

In CSMA/CA with a binary exponential backoff method, the devices, also termed stations, may use a predefined time slot of a time interval to access the channel of WLAN. This time interval may be known in the art as a contention window (CW). The CW may include a predetermined number of slots. In order to reduce the probability of collisions, a station may monitor transmissions of other stations over the channel and may decide to access the channel in a desired time slot of the CW. The desired time slot may be selected randomly from the time slots of the CW and the size of CW may be varied based on a probability of collisions and/or a collision rate parameter, if desired.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
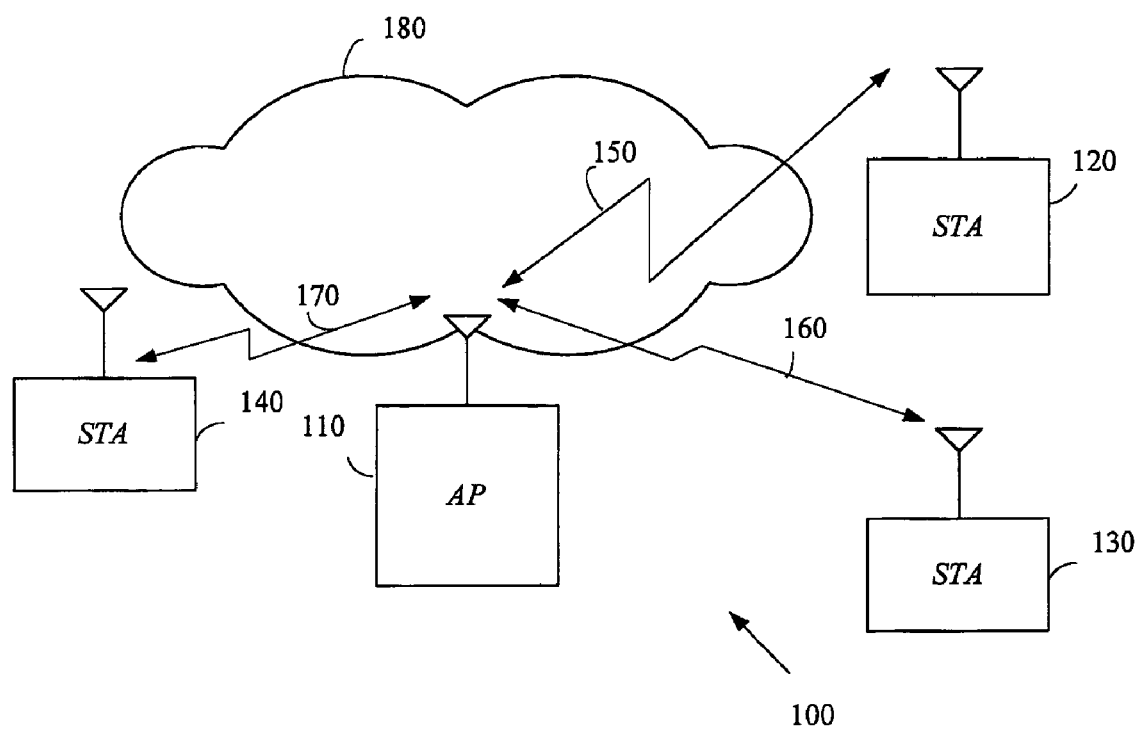
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal frequency-division multiplexing (OFDM) and the like.

Turning first to FIG. 1, a wireless communication system 100, for example, a WLAN communication system is shown. Although the scope of the present invention is not limited in this respect, the exemplary WLAN communication system 100 may be defined by IEEE 802.11-1999 standard, as a basic service set (BSS). For example, the BSS may include at least one access point (AP) 110 and at least one station (STA) 120. However, in this exemplary embodiment, wireless communication system 100 may include stations 120, 130, 140 that may communicate with AP 110 over a shared wireless media 180 that may include, for example, links 150, 160, 170.

Although the scope of the present invention is not limited in this respect, station 120 may communicate with AP 110 through link 150, station 130 may communicate with AP 110 through link 160, and station 140 may communicate with AP 110 through link 170. Stations 120, 130, 140 may monitor transmissions of data packets over shared wireless media 180 and may accumulate statistic on plurality of parameters, such as, for example, the number of transmission within a CW, the number of transmission outside the CW, the number of collisions, the number of times that a data packet is deferred before starting transmission, the number of times that a channel carrying the data packet is busy after transmission of the data packet, and the like.

In some embodiments of the invention, the statistic may be used to calculate a parameter related to a probability of collisions of data packets transmitted from a desired slot of the CW. The probability of collision parameter may be used by station to vary the size of CW and/or to access shared wireless media 180 using other access methods, if desired. For example, station 140 may access shared wireless media 180 within a time slot which may be randomly selected from time slots of CW and may have the lowest probability of collision estimation within the CW. In this example, the size of CW may not vary.

Figure 2:
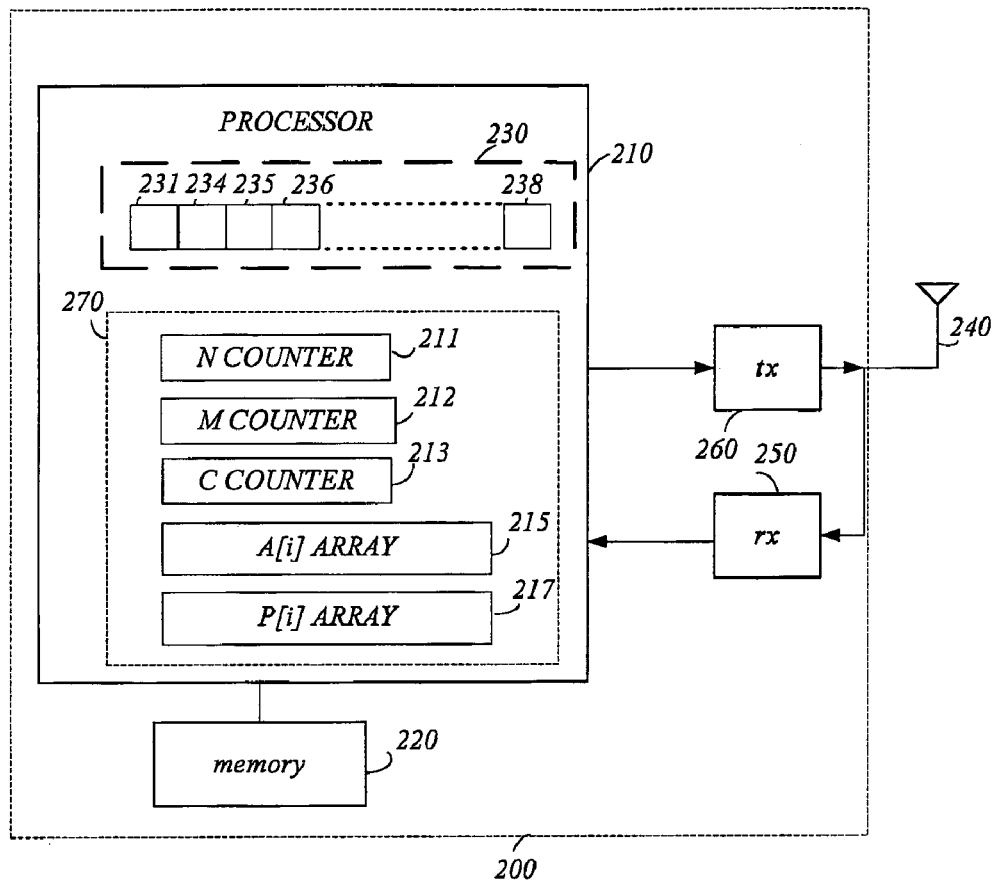
FIG. 2 is a block diagram of a station according to an exemplary embodiment of the present invention.

Turning to FIG. 2, a block diagram 200 of a station according to exemplary embodiment of the present invention is shown. Although the scope of the present invention is not limited in this respect, station 200 may include a processor 210 that may be used to accumulate statistics of collisions and to estimate a probability of collision. In addition, station 200 may include a memory 220. Memory 220 may be used to store parameters, which may be helpful in representing estimations of the probability of collision for time slots 231, 233, 234, 235, 236, 238 of a contention window (CW) module 230. In addition, memory 220 may store estimations of probabilities of collisions of time slots 231, 233, 234, 235, 236, 238 for further use, if desired. In embodiments of the invention, station 200 may also include an antenna 240, a receiver (RX) 250 and a transmitter (TX) 260

Although the scope of the present invention is not limited in this respect, processor 210 may include counters 211, 212, 213 and arrays 215, 217. Counters 211, 212, 213 and arrays 215, 217 may be used in generating the parameters relating to probabilities of collision. In some embodiments of the invention, estimation and/or generation of probability of collision parameters may be implemented by software and counters 211, 212, 213 and arrays 215, 217 may be embodied in a software module 270, if desires. Although the scope of the present invention is not limited in this respect, counters 211, 212, 213 and arrays 215, 217 may be implemented in software, in hardware and/or in any suitable combination of software and hardware.

Although the scope of the present invention is not limited in this respect, antenna 240 may be used to transmit the data packets that are provided by TX 260 and/or to receive data packets that may be provide to RX 250. Although the scope of the present invention is not limited in this respect, antenna 240 may include an internal antenna, or an omni-directional antenna, or a monopole antenna, or a dipole antenna, or an end fed antenna or a circularly polarized antenna, or a micro-strip antenna, or a diversity antenna, or the like.

Although the scope of the present invention is not limited in this respect, TX 260 may include a power amplifier, or an outphasing transmitter with reactive termination, or a linear transmitter, or a non-linear transmitter, or the like. In some embodiments of the invention, RX 250 may include a demodulator (not shown), a baseband process, and the like. RX 250 may provide the data packets and other parameters used for accumulating the probability of collision statistics to processor 210.

Although the scope of the present invention is not limited in this respect, processor 210 may include a controller, a media access processor, or a digital signal processor, or an application processor, or the like. In some embodiments of the invention memory 220 may be embodied in a storage medium and may include a Flash memory, and/or a random access memory (RAM) and/or a non-volatile memory and/or a volatile memory and the like.

Figure 3:
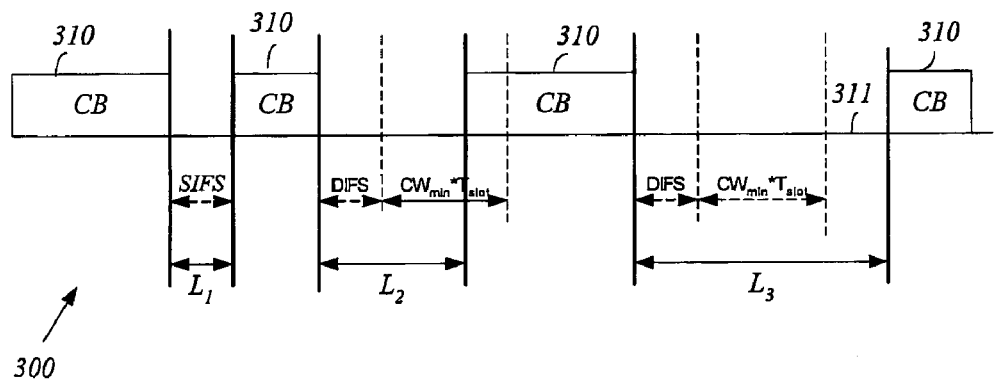
FIG. 3 is a schematic illustration of an exemplary timing diagram of transmissions within a wireless communication network according to embodiments of the present invention.

Turning to FIG. 3, a timing diagram 300 of an exemplary channel access protocol according to some embodiments of the invention is shown. Although the scope of the present invention is not limited in this respect, timing diagram 300 shows intervals of time that may be related to shared wireless media 180. The time intervals shown in FIG. 3 may be referred to as a "channel". In this example, a channel busy (CB) interval 310 may indicate a transmission of data packets. In addition, timing diagram 300 may include time intervals L1, L2 and L3. In this example, time interval L1 may include a short interframe space (SIFS); time interval L2 may include a distributed interframe space (DIFS) and at least part of a CW; and time interval L3 may include the DIFS, the CW and a time interval 311. Although the scope of the present invention is not limited in this respect, time intervals DIFS, SIFS and the CW may be defined by IEEE-802.11-1999 standard. Accordingly, the CW may be equal to $CW_{min}*T_{slot}$ wherein, $CW_{min}$ may be the minimum size of the CW and $T_{slot}$ may be the slot time of the CW. For example, when IEEE-802.11a-19999 is used, the size of $CW_{min}$ may be 15 and $T_{slot}$ may be 9 microseconds (μsec) and, when IEEE 802.11b is used, the size of $CW_{min}$ may be 31 and $T_{slot}$ may be 20 μsec Although the scope of the present invention is not limited in this respect, an estimation of the collision rate may be based on the following formula:

$$P_{col} = P_{inCW} * P_{col\_InCW},$$

wherein $P_{inCW}$ represents the probability that a packet transmission may start within the CW; and $P_{col\_InCW}$ represents the probability of collision of a data packet transmitted within the CW.

Although the scope of the present invention is not limited in this respect, the estimation of the collision rate may be preformed in two parallel calculations of $P_{inCW}$ and $P_{col\_InCW}$, if desired. In embodiments of the present invention, the first calculation may include calculation of values of $P_{col\_InCW}$ for slots of CW module 230 (e.g. slots 231, 234, 235, 236, 238), wherein $P_{col\_InCW}$ may be calculated separately for a desired slot. The calculation of $P_{col\_InCW}$ may include the use in a histogram of transmissions by other stations at the desired slot. The second calculation may include an estimation of $P_{inCW}$ using the histogram of transmissions. Furthermore, the probability of collision $P_{inCW}$ may depend on whether the transmission of a data packet begins within the CW, when some other stations of wireless communication system 100 may attempt to obtain channel access, or may depend on whether the transmission of the data packet begins outside the CW, for example, within time interval 311 of slot L3, if desired.

Although the scope of the present invention is not limited in this respect, in alternative embodiments of the invention, the probability of collision may be represented by the following formula:

$$P_{col} = P_{inCW} * P_{colInCW} + (1 - P_{inCW}) * P_{col\_OutCW},$$

wherein, $P_{inCW}$ represents the probability that a data packet transmission starts within the CW, $P_{col\_InCW}$ represents the probability of collision of a data packet transmitted within the CW, and $P_{col\_OutCW}$ represents the probability of collision of a data packet transmitted outside the CW.

Figure 4:
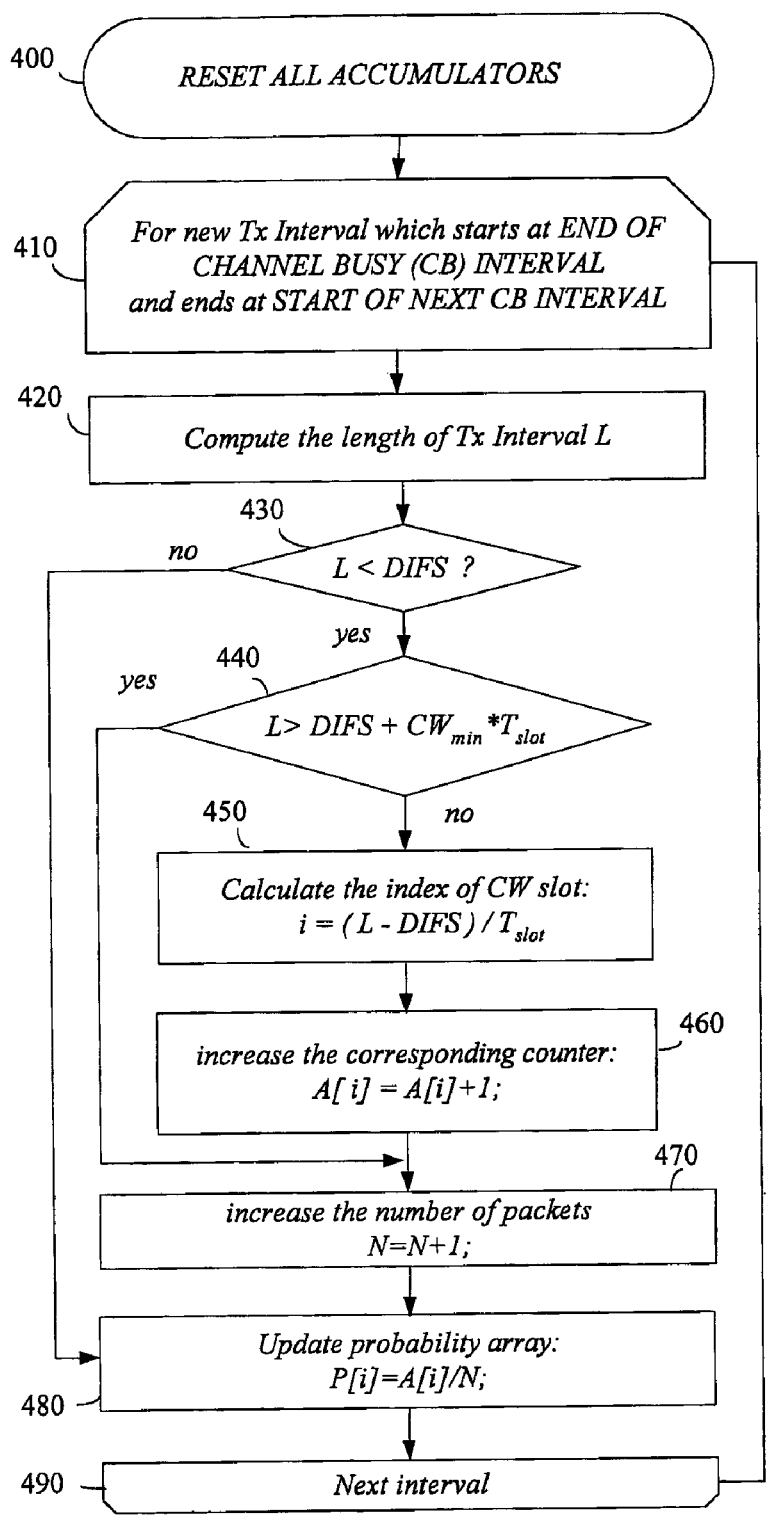
FIG. 4 is a flowchart of a method to calculate the probability of collision for a data packet transmitted within a contention window (CW) according to some exemplary embodiments of the invention.

Turning to FIG. 4, a method to calculate the probability of collision of a data packet transmitted from one station with at least one other data packet transmitter by another station of wireless communication system 100 (FIG. 1) within a CW (e.g. $P_{col\_InCW}$) according to exemplary embodiment of the invention is shown. Although the scope of the present invention is not limited in this respect, in some embodiments of the invention, the transmission of data packets may be performed according to the distributed coordination function (DCF) rules as of IEEE-802.11-19999 standard. Although the scope of the present invention is not limited in this respect, the method may begin by performing a reset operation to accumulators (box 400) that may accumulate statistics of collisions in different time slots of the CW (e.g. CW 230 and time slots 231, 234, 235, 236, 238 of FIG. 2). The method may be performed for time intervals (for example intervals L1, L2, L3 of FIG. 3) that are between two CB intervals 310 (box 410). The time interval may be denoted by L, which is the length of the interval between the end of last Channel Busy (CB) interval and the start of the next CB interval (box 420).

Although the scope of the present invention is not limited in this respect, if interval L is smaller then DIFS (e.g., L<DIFS) (box 430), for example, interval $L_1$ of FIG. 3, no transmission opportunity may be possible and, thus, intervals of this type may be ignored. If interval L is greater then DIFS (e.g. L>DIFS), then a test of L>(DIFS+$CW_{min}$*$T_{slot}$) may be performed (box 440). In the case that time interval L is smaller then the value of DIFS+$CW_{min}$*$T_{slot}$ (e.g. L<(DIFS+$CW_{min}$*$T_{slot}$), for example, time interval $L_2$ of FIG. 3, a calculation of an index I of the CW time slot may be performed, e.g., using the equation I=(L−DIFS)/$T_{SLOT}$ (box 460) and the station, for example station 200, may increase the counter that corresponds to the i-th interval of the CW. For example, the counter of array 215 may be advanced such that A[I]=A[I]+1 (box 460).

Although the scope of the present invention is not limited in this respect, in the case that L>(DIFS+$CW_{min}$*$T_{slot}$) for example, time interval $L_3$ of FIG. 3 (e.g. the YES rout in the flowchart), the data packet may not be ready to be transmitted within CW 230 or the data packet may be sent with a larger than average CW size, e.g., following an exponential backoff procedure after a previous failure of CSMA/CA with a binary exponential backoff method access mechanism. In some embodiments of the invention, the probability that there is another packet to transmit for the $i^{th}$ slot of CW module 230 may be computed using array 215, which may include separate accumulators for slots 231, 234, 235, 236, 238 and an N counter, for example, N counter 211 (FIG. 2), to count the detected packets. In this case, the value of N counter 211 may be increased (box 480) and the probability that a data packet may be transmitted in $i^{th}$ slot of CW 230 may be determined by updating the stored values of probability array 217 according to P[I]=A[I]/N, wherein the value of P[I] may represent the parameter $P_{col\_InCW}$ of slot I, if desired (box 480). The method to estimate $P_{col\_inCW}$ may be repeated for the next interval for which the transmission channel become free (box 490).

Figure 5:
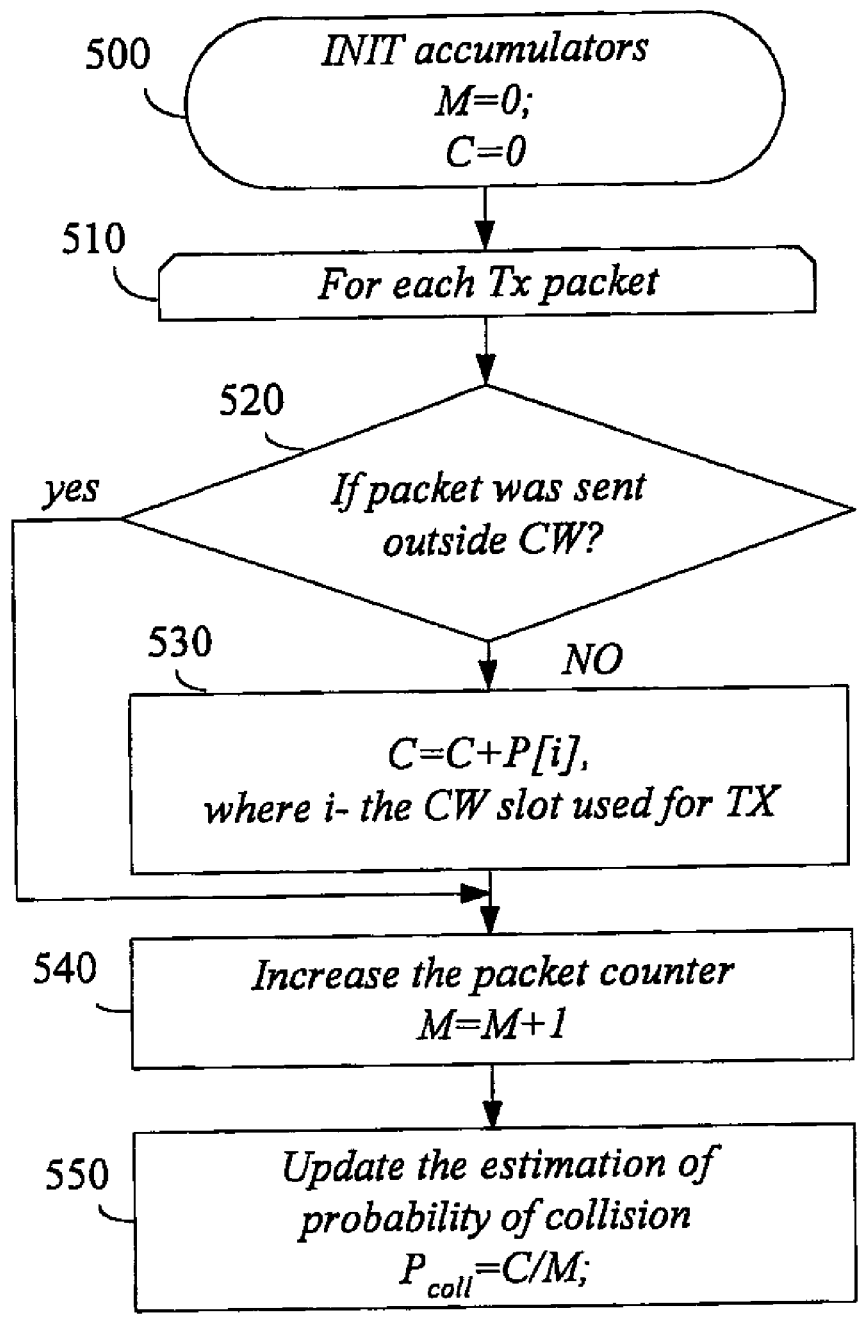
FIG. 5 is a flowchart of a method of calculating the probability of collision according to exemplary embodiments of the invention.

Turning to FIG. 5, a method of calculating the probability of collision according to exemplary embodiments of the invention is shown. Although the scope of the present invention is not limited in this respect, the method may begin by initializing M counter 212 and C counter 213 (box 500). In some embodiments of the invention, C counter 213 may accumulate the probability of collision of data packets that may be transmitted within CW 230 and M counter 212 may accumulate the number of data packets that may be transmitted from station 200. The method may be repeated every time a data packet is transmitted (box 510). The first test may be if the data packet may be transmitted within CW 230 or outside CW 230 (box 520). For a data packet that was transmitted within CW 230, C counter 213 may be increased by a value which may be stored in probability array 217 for the time slot [I] used for the transmission of the data packet, for example C=C+P[I] (box 530).

Although the scope of the present invention is not limited in this respect, if the data packet is transmitted outside CW 230, M counter 212 may be increased by 1, for example, M=M+1 (box 540) and estimation of the probability of collision $P_{coll}$ may be updated by recalculating $P_{coll}$=C/M, if desired.

Although the scope of the present invention is not limited in this respect, in some embodiments of the invention, the following calculation may be performed:

$P_{inCW}$=M/N $P_{outCW}$=(N−M)/N wherein N may be the number of transmissions and M may be the number of transmission within CW 230.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of controlling an access of a station to a shared wireless media comprising:
    calculating a first probability value representing a probability of a first station to transmit a data packet within a desired time slot of a contention window by counting the data packets transmitted from said first station within any time slot of said contention window to provide a third number, counting the data packets transmitted from any station in said shared wireless media within any time slot of said contention window to provide a fourth number and dividing said third number by said fourth number;
    calculating a second probability value representing a probability of said data packet when transmitted by the first station within the desired time slot of said contention window to collide with at least one other data packet transmitted by a second station; and
    transmitting a data packet from said first station to a shared wireless media based on a collision rate parameter calculated from said first and said second probability values,
    wherein said second probability value is calculated by:
        counting data packets transmitted within said desired time slot to provide a first number;
        counting data packets transmitted within said desired time slot and within at least one other time slot of said contention window to provide a second number; and
        dividing the first number by the second number.

2. The method of claim 1, comprising:
    storing the first number in a first array and storing the second number in a second array, wherein a common index to the first and second arrays indicates on the desired time slot of the contention window of which the first number and the second number is related to.

3. The method of claim 2, comprising:
    transmitting an additional data packet by the first station;
    recalculating the second probability value; and
    updating the first and second arrays according to the recalculated second probability.

4. A station in a shared wireless media comprising:
    a computer readable medium encoded with computer executable instructions to control transmission between the station and the shared wireless media based on a collision rate parameter calculated from at least a first probability value representing a probability of the station to transmit a data packet within a desired time slot of a contention window and a second probability value representing a probability of said data packet, when transmitted by the station within the desired time slot of said contention window, to collide with at least one other data packet transmitted by another station;

a transmitter to transmit a data packet to said shared wireless media responsive to the control of said computer readable medium encoded with computer executable instructions, wherein the station comprises:

a first counter to count a first number of data packets transmitted within said desired time slot;

a second counter to count a second number of data packets transmitted within said desired time slot and within at least one other time slot of said contention window;

a third counter to count a third number of data packets transmitted within any time slot in said contention window from said station;

a fourth counter to count a fourth number of data packets transmitted by any station in said shared wireless media within any time slot in said contention window;

to calculate the first probability value by dividing the third number by the fourth number; and to calculate the second probability value by dividing said first number by said second number.

5. A wireless communication system comprising:

a first station and a second station wherein at least the a first station having a computer readable medium encoded with computer executable instructions to control an access of the first station to a shared wireless media based on a collision rate parameter calculated from at least a first probability value representing a probability of the station to transmit a data packet within a desired time slot of a contention window and a second probability value representing a probability of said data packet, when transmitted by the station within the desired time slot of said contention window, to collide with at least one other data packet transmitted by another station;

wherein the system comprises:

a first counter to count a first number of data packets transmitted within said desired time slot;

a second counter to count a second number of data packets transmitted within said desired time slot and within at least one other time slot of said contention window;

a third counter to count a third number of data packets transmitted within any time slot in said contention window from said station;

a fourth counter to count a fourth number of data packets transmitted by any station in said shared wireless media within any time slot in said contention window;

to calculate the first probability value by dividing the third number by the fourth number; and to calculate the second probability value by dividing said first number by said second number.

6. An article comprising storage medium having stored thereon instructions that when executed, result in:

controlling an access of a first station to a shared wireless media based on a collision rate parameter calculated from at least a first probability value representing a probability of the first station to transmit a data packet within a desired time slot of a contention window and a second probability value representing a probability of said data packet when transmitted by the first station within the desired time slot of said contention window to collide with at least one other data packet transmitted by a second station;

counting a third number of data packets transmitted from said first station within any time slot within said contention window;

counting a fourth number of data packets transmitted from any station in said shared wireless media within any time slot in said contention window;

calculating the first probability value by dividing the third number by the fourth number;

calculating the second probability by:

counting a first number of data packets transmitted within said desired time slot;

counting a second number of data packets transmitted within said desired time slot and within at least one other slot of said contention window; and calculating the second probability value by dividing the first number by the second number.

* * * * *